US012459482B2

(12) United States Patent
Chelaidite et al.

(10) Patent No.: US 12,459,482 B2
(45) Date of Patent: Nov. 4, 2025

(54) ROTOR CONDITION MONITORING SYSTEM AND METHOD

(71) Applicant: ZF Active Safety US Inc., Livonia, MI (US)

(72) Inventors: Galus Chelaidite, South Lyon, MI (US); Cusi Diego, Northville, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 235 days.

(21) Appl. No.: 18/324,366

(22) Filed: May 26, 2023

(65) Prior Publication Data

US 2024/0391446 A1 Nov. 28, 2024

(51) Int. Cl.
*B60T 17/22* (2006.01)
*B60Q 9/00* (2006.01)
*F16D 66/00* (2006.01)
*G07C 5/08* (2006.01)

(52) U.S. Cl.
CPC ............. *B60T 17/22* (2013.01); *B60Q 9/00* (2013.01); *F16D 66/00* (2013.01); *G07C 5/0816* (2013.01); *B60T 2250/04* (2013.01); *F16D 2066/005* (2013.01); *F16D 2066/006* (2013.01)

(58) Field of Classification Search
CPC ....... B60T 17/22; B60T 2250/04; B60Q 9/00; F16D 66/00; F16D 2066/005; F16D 2066/006; G07C 5/0816
USPC ...................................................... 701/34.4
See application file for complete search history.

(56) References Cited

U.S. PATENT DOCUMENTS

| | | | | |
|---|---|---|---|---|
| 11,926,296 | B2* | 3/2024 | Yokoyama | B60T 1/065 |
| 2008/0272717 | A1* | 11/2008 | Gleason | B60K 6/547 |
| | | | | 318/567 |
| 2016/0245351 | A1* | 8/2016 | Johnson | B60T 8/173 |
| 2018/0194353 | A1* | 7/2018 | Kilmurray | B60W 30/18136 |
| 2018/0372200 | A1* | 12/2018 | Kumar | B60K 6/442 |
| 2019/0005747 | A1* | 1/2019 | Serra | G07C 5/0808 |
| 2020/0392916 | A1* | 12/2020 | Hellstrom | F02D 41/1495 |
| 2021/0061028 | A1* | 3/2021 | Da Deppo | B60C 23/00327 |
| 2021/0234495 | A1* | 7/2021 | Seo | G01K 7/36 |
| 2021/0234496 | A1* | 7/2021 | Seo | H02P 29/662 |
| 2022/0363405 | A1* | 11/2022 | Auerbach | B64F 5/60 |
| 2023/0304555 | A1* | 9/2023 | Nagata | B60T 17/22 |
| 2023/0375060 | A1* | 11/2023 | Xing | F16D 66/023 |

(Continued)

FOREIGN PATENT DOCUMENTS

| | | | | |
|---|---|---|---|---|
| CN | 114506444 A * | 5/2022 | | B64C 25/44 |
| DE | 102018210156 A1 | 12/2019 | | |

(Continued)

OTHER PUBLICATIONS

Search Report for corresponding German Application Serial No. 10 2024 114 225.1, dated Mar. 28, 2025, pp. 1-10.

*Primary Examiner* — Atul Trivedi
(74) *Attorney, Agent, or Firm* — Tarolli, Sundheim, Covell & Tummino LLP (57) ABSTRACT

A method of monitoring a rotor of a motor vehicle having a caliper assembly driven by a motor for braking the vehicle includes detecting at least one harmonic response during a braking operation indicative of the interaction between the caliper assembly and the rotor. The at least one harmonic response is evaluated during the braking operation and an operator of the vehicle is notified of a condition of the rotor based on the evaluation.

19 Claims, 12 Drawing Sheets

(56) References Cited

U.S. PATENT DOCUMENTS

| | | | | |
|---|---|---|---|---|
| 2024/0270227 A1* | 8/2024 | Nagata | ................... | B60T 8/171 |
| 2024/0317195 A1* | 9/2024 | Pagni | ....................... | G01L 3/20 |
| 2024/0317207 A1* | 9/2024 | Brandt | ................. | B60W 50/14 |
| 2024/0391446 A1* | 11/2024 | Chelaidite | ............ | G07C 5/0816 |
| 2024/0392852 A1* | 11/2024 | Biggins | ................ | F16D 66/027 |
| 2024/0400031 A1* | 12/2024 | Diamond | ............. | B60T 17/221 |

FOREIGN PATENT DOCUMENTS

| | | | | |
|---|---|---|---|---|
| DE | 102019113004 A1 | 12/2019 | | |
| DE | 112019000912 T5 * | 11/2020 | ........... | B60T 13/662 |
| DE | 102021131011 A1 | 8/2022 | | |
| EP | 4501722 A1 * | 2/2025 | ........... | F16D 55/226 |
| JP | 7282577 B2 * | 5/2023 | ............. | F16D 65/18 |
| JP | 7579975 B2 * | 11/2024 | ............. | F16D 65/18 |
| WO | WO-03033931 A1 * | 4/2003 | ............. | F16D 65/18 |
| WO | WO-2020230015 A1 * | 11/2020 | ......... | F16D 65/0068 |
| WO | WO-2024197198 A2 * | 9/2024 | ............... | G01L 5/28 |
| WO | WO-2024224600 A1 * | 10/2024 | ................ | B60T 7/12 |

* cited by examiner

FIG. 9

ROTOR CONDITION MONITORING SYSTEM AND METHOD

TECHNICAL FIELD

The present invention relates to braking systems and, in particular, relates to a method for monitoring a condition of a wheel rotor.

BACKGROUND

Current vehicles are equipped with hydraulic service brakes and electric parking brakes (EPB) for helping control vehicle braking depending on predetermined scenarios. The service brakes rely on one or more movable pistons that selectively apply force to brake pads in order to slow down or stop rotating wheel rotors on the vehicle.

SUMMARY

In one example, a method of monitoring a rotor of a motor vehicle having a caliper assembly driven by a motor for braking the vehicle includes detecting at least one harmonic response generated by the interaction between the caliper assembly and the rotor during a braking event. The interaction during a braking event is evaluated by the EMB controller and, potentially at least one harmonic response is detected. An operator of the vehicle is notified, if necessary, of a condition of the rotor based on the evaluation.

In another example, a system for monitoring a rotor of a motor vehicle having a caliper assembly driven by a motor for braking the vehicle includes at least one sensor connected to the caliper assembly for monitoring braking events, including an interaction between the caliper assembly and the rotor during braking events. A controller is provided for receiving signals from the at least one sensor which are processed by the controller to include detection of at least one harmonic event during the braking event indicative of the interaction based on the signals. The controller is configured to notify an operator of the vehicle, if necessary, of a condition of the rotor in response to an evaluation result indicating at least one harmonic response during and/or after a braking event.

Other objects and advantages and a fuller understanding of the invention will be had from the following detailed description and the accompanying drawings.

DETAILED DESCRIPTION

Figure 1:
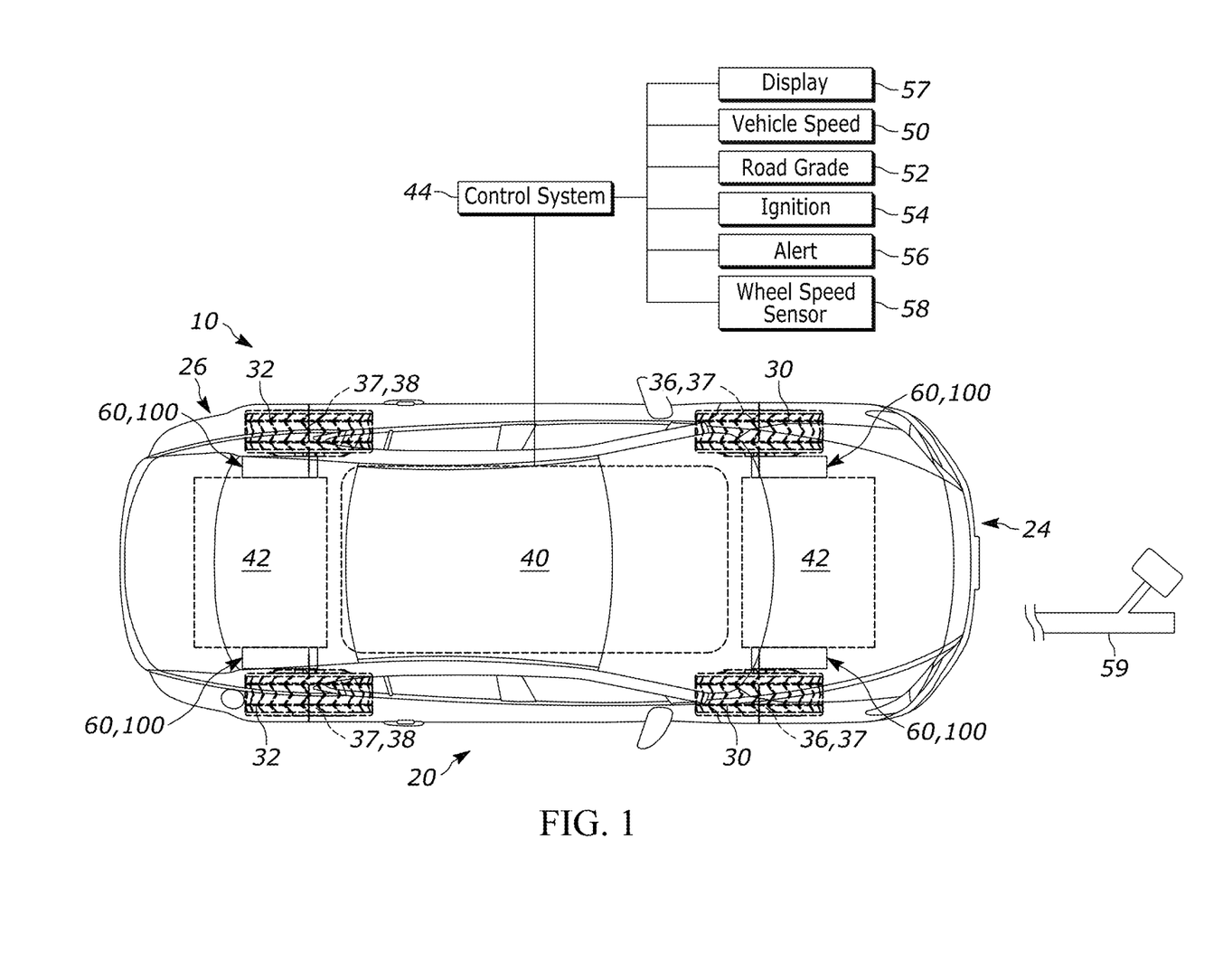
FIG. 1 is a schematic illustration of a vehicle having a braking system.

The present invention relates to braking systems and, in particular, relates to a method for monitoring a condition of a wheel rotor. FIG. 1 illustrates an example electric brake/braking system 10 for a motor vehicle 20 in accordance with the present invention. The vehicle 20 can be an electric or hybrid vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of steerable or non-steerable wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

In the case of an electric vehicle, a battery 40 supplies power to the vehicle 20 and cooperates with front and/or rear powertrains 42 to supply torque to the wheels 30. In other words, the battery 40 forms part of the vehicle propulsion system.

Figure 2:
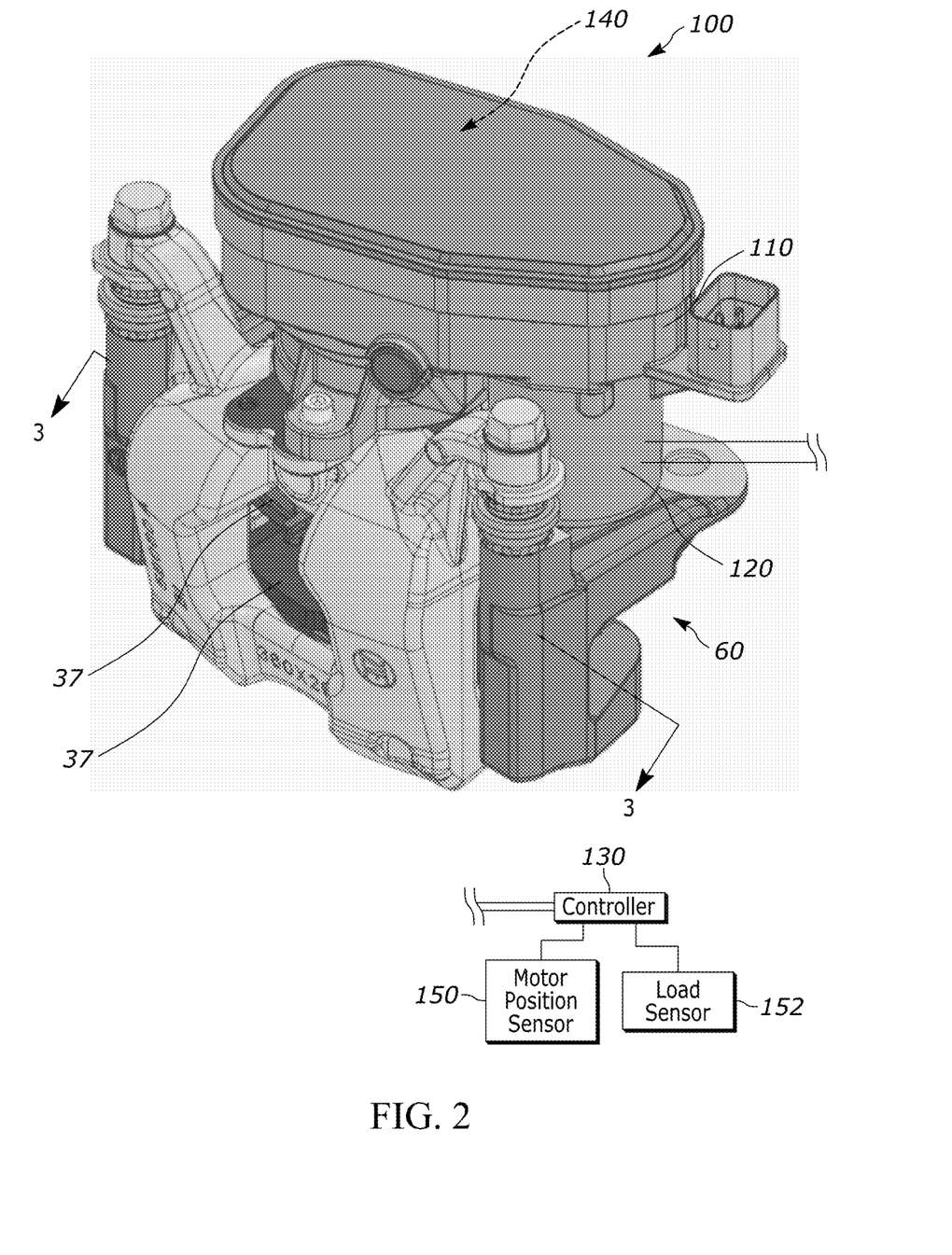
FIG. 2 is a perspective view of an example caliper assembly and actuator for the braking system of FIG. 1.

Referring further to FIG. 2, a caliper or caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. The caliper assembly 60 is an electromechanical brake and therefore does not rely on or require hydraulic fluid to operate. In one example, the caliper assembly 60 can be wire-controlled and therefore is not mechanically or hydraulically connected to the brake pedal.

Figure 3:
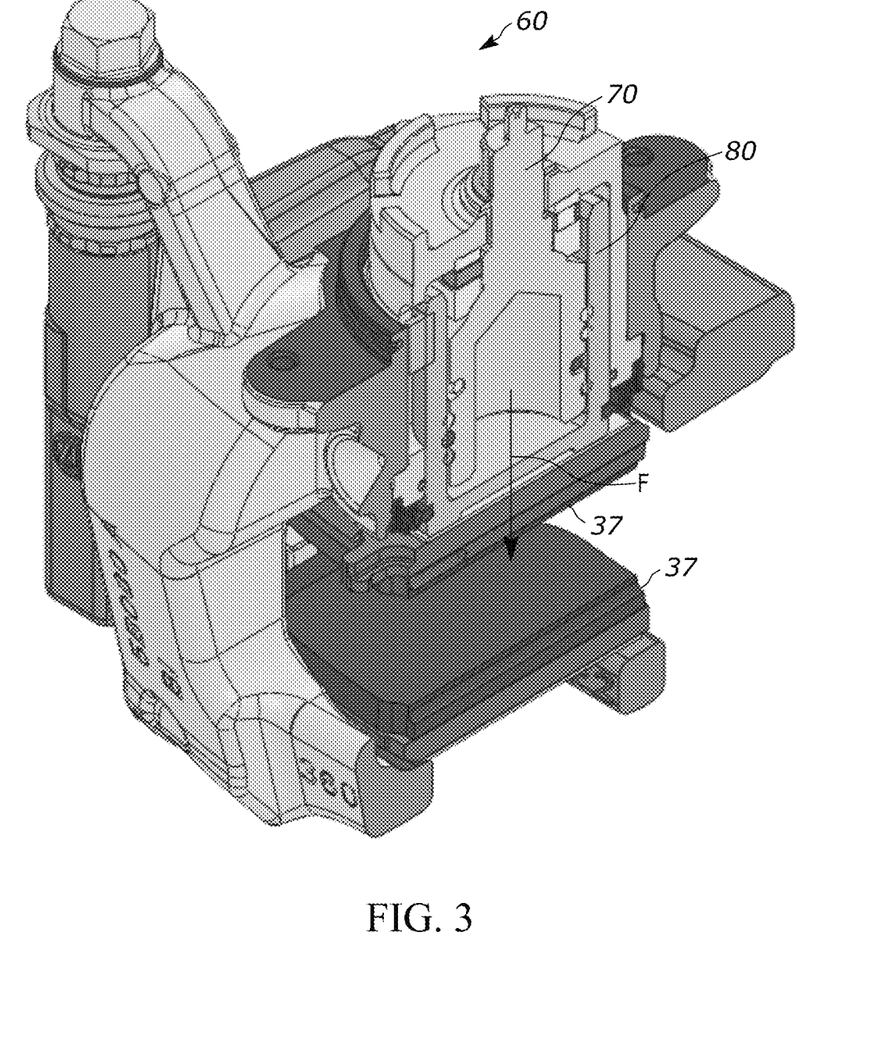
FIG. 3 is a section view of the caliper assembly taken along line 3-3 in FIG. 2.

As shown in FIG. 3, the caliper assembly 60 includes a spindle 70 and one or more pistons 80 operably coupled thereto for selectively applying braking or clamping force F to the rotor 36 via the brake pads 37 in a known manner.

The caliper assembly 60 can be configured as a ball nut assembly (recirculating or non-recirculating), a roller screw, a ball ramp assembly or any high efficiency mechanical assembly capable of converting rotary motion of the spindle to linear motion of the piston(s). Examples of ball nut and ball ramp assemblies can be found in U.S. Pat. No. 9,976,614 and U.S. Patent Publication No. 2019/0331180, the entirety of which are incorporated herein by reference.

Returning to FIG. 1, a control system 44 is provided to help control operation of the vehicle 20, such as operation of the propulsion system and vehicle braking, including operation of the caliper assemblies 60. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree—including velocity and acceleration—a brake pedal 59 is depressed/actuated.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more caliper assemblies 60. The control system 44 can also be connected to an alert 56 for notifying the driver/operator of the vehicle 20 of vehicle conditions, vehicle status, braking operations, and/or environmental conditions. A display 57 can be provided to visually present the alert 56 to the vehicle operator.

With this in mind, a motor gear unit or actuator 100 is connected to each caliper assembly 60 for helping to electrically control the application and removal of clamping force F on each rotor 36. As shown in FIGS. 2-3, an example actuator 100 includes a housing 110 defining an interior space 112. A motor 120 is connected to the housing 110 and is actuated to rotate in the counterclockwise or clockwise directions.

A gear train 140, which includes a planetary gear stage, is provided in the interior space 112 and connected to both the motor 120 and the spindle 70 for transferring torque therebetween. In one example, the gear train 140 is configured such that rotation of the motor 120 in one direction results in advancing the piston 80 towards the rotor 36 to apply clamping force F thereto in order to brake the vehicle 20. On the other hand, rotation of the motor 120 in the other direction results in retreat of the piston 80 away the rotor 36 to reduce or release clamping force F on the rotor 36.

That said, the operation of each motor 120 is controlled by a separate brake controller 130. In other words, each caliper assembly 60 has its own, dedicated brake controller 130. Each brake controller 130 includes pre-loaded software that enables the brake controller to precisely control the associated motor 120 and, thus, precisely control the clamping force F applied to the associated rotor 36.

In one instance, rotation of the motor 120 can be precisely controlled by the brake controller 130 using pulse width modulation (PWM). For example, the degree and/or rate of clamping force F on the pad 37 during braking can be finely tuned as well as the degree and/or rate of clamping force reduction during an ABS event. The control system 44 can rely on signals from any of the sensors indicating, for example, signals indicative of road surface conditions, in controlling PWM.

With this in mind, one or more sensors can be connected to the caliper assembly 60 and the brake controller 130 to help the brake controller operate the motor 120. For example, a motor position sensor 150 is provided on the motor 120 and measures not only the motor shaft position but also the motor speed/direction. Signals from the motor position sensor 150 can be used to retract the piston 80 during off brake driving.

The brake controller 130 can also monitor the current draw on the motor 120, which can be used to infer the clamping force F. An optional force or load sensor 152 can be provided at the piston 80 for measuring the reaction force of the brake pad 37 on the piston as the clamping force F is applied to the rotor 36. Alternatively, a torque sensor and/or pressure sensor (not shown) can be used to measure the reaction force. In other words, these sensor(s) can directly measure the clamping force F.

During vehicle 20 operation, a service brake apply demand is initiated by the system and/or vehicle operator. In this example, service braking is provided for a single, rear end 26 wheel rotor 38. The brake demand is based on signals received by the control system 44 indicative of the brake pedal 59 depression (see FIG. 1).

With this in mind, the control system 44 communicates with the brake controller 130 associated with the rear end 26 wheel rotor 38 to activate the motor 120 in the brake apply direction to supply torque to the spindle 70 along the aforementioned flow path. This, in turn, causes the piston 80 to apply a clamping force F to the brake pad 37, thereby braking the rotor 38 at the surfaces 170, 172 in a known manner. Rotation of the motor 120 continues until the brake controller 130 estimates that a target clamping force F is applied to the rotor 38.

Figure 4A:
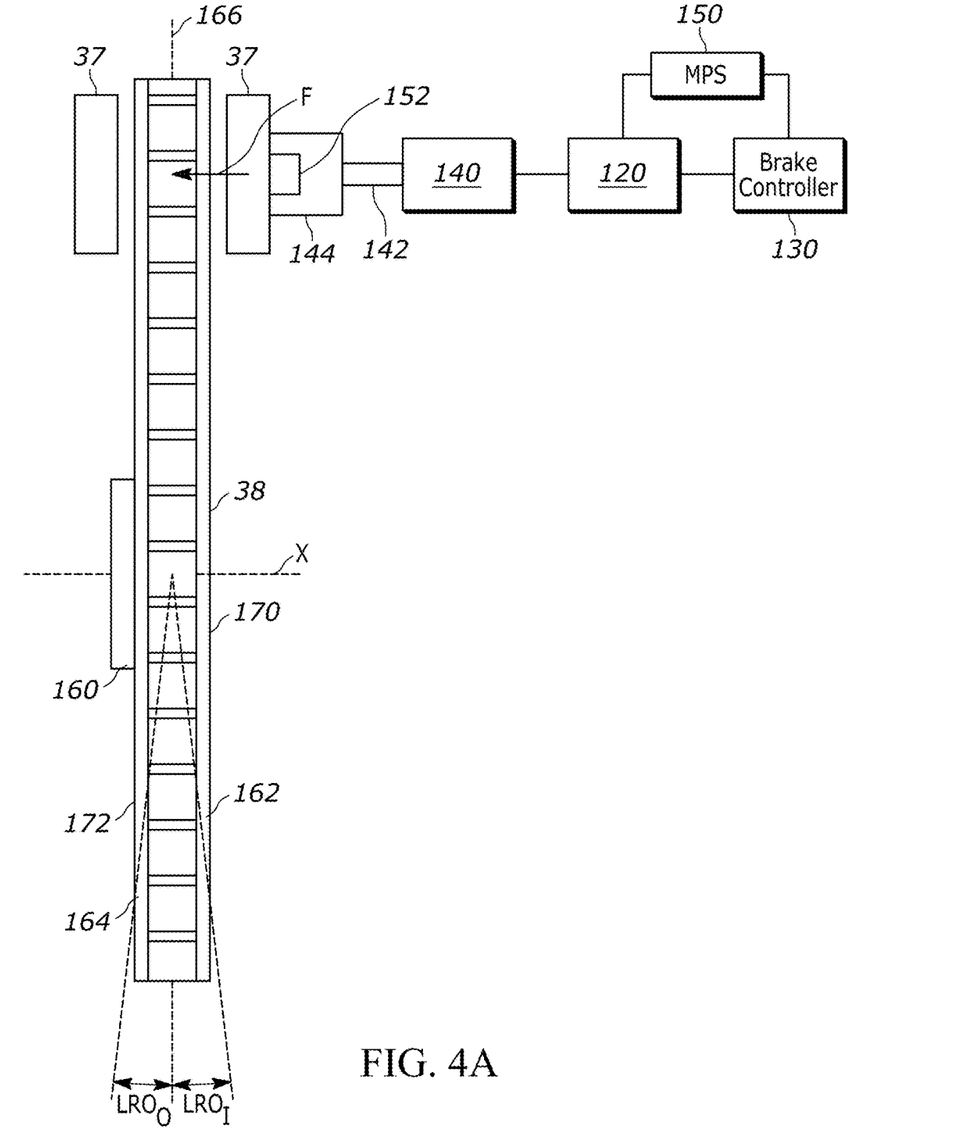
FIG. 4A is a schematic illustration of a rotor for the caliper assembly and a system for monitoring the condition of the rotor.

As shown in FIG. 4A, a central hat 160 mounts the rotor 38 to the axle. A pair of parallel plates 162, 164 are connected to each other and to the hat 160 to form the rotor 38. A plane 166 extends between and parallel to the plates 162, 164. In the orientation shown, the plate 162 is designated the inboard plate when the rotor 38 is mounted in the vehicle 20. The plate 164 is the outboard plate. The brake pads 37 apply the clamping force F to outer surfaces 170, 172 of the respective plates 162, 164.

Once mounted in the vehicle 20, there are several quantifiable characteristics of the rotor 38 during braking operations. The first is lateral runout (LRO), which refers to the degree the rotor 38 wobbles or tilts relative to the plane 166 as it rotates about the wheel axis X. The LRO can be on the order of, for example, about 50 μm for smaller vehicles and about 100-120 μm for larger vehicles/trucks as measured at the rotor outer diameter on the plate surfaces 170, 172. As shown in FIG. 4A, the LRO can be on both sides of the plane 166, which are designated $LRO_I$ and $LRO_O$ and exaggerated in the figure for clarity.

An additional trait of the rotor 38 relates to warping. This can occur, due to the release of residual stress within the rotor casting, from thermal gradients around the rotor, and/or from the actual rotor design. The warping exacerbates the LRO and thereby increases the clamping force F variation. This, in turn, causes the caliper assembly 60 to forcibly move in the inboard and outboard directions (parallel to the wheel axis X) plate during braking since it applies a clamp force F on the plates 162, 164. The forced move intensity can increase, such as to feel like a vibration, especially as the vehicle 20 is decelerated from high speed. Thus, the faster the vehicle is traveling during a brake event, the more obvious the vibration would be to the vehicle operator.

Figure 4B:
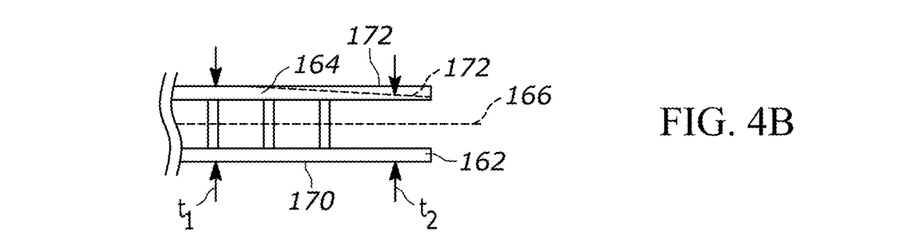
FIG. 4B is an enlarged view of a portion of the rotor of FIG. 4A.

Another trait of the rotor 38 is illustrated in FIG. 4B and relates to variations in the thickness of the rotor 38 as measured between the plate surfaces 170, 172 at various locations around the rotor 38—also known as disk thickness variation (DTV). The braking surfaces 170, 172 initially extend parallel to one another and define a first, uniform thickness $t_1$ therebetween. As the plates 162 undergoes multiple braking operations over time, one or both surfaces 170, 172 can become worn and/or are worn at different rates. As a result, some portions of the plates 162, 164 can have a different thickness than other portions around the rotor 38. Consequently, the distance between the surfaces 170, 172 can vary in the circumferential direction of the plates 162, 164. In this example, the radially outermost portions of the plates 162, 164 define a second thickness $t_2$ less than the first thickness $t_1$ such that the plate surfaces 170, 172 are no longer parallel to one another around the rotor 38.

Considering the above, the brake controller 130 is capable of monitoring the condition of the rotor 38 and brake pads 37 during braking operations by tracking signals received by the sensors 150 and/or 152 and alerting the operator of the vehicle 20 when one or more of the aforementioned rotor traits is present.

Figure 5A:
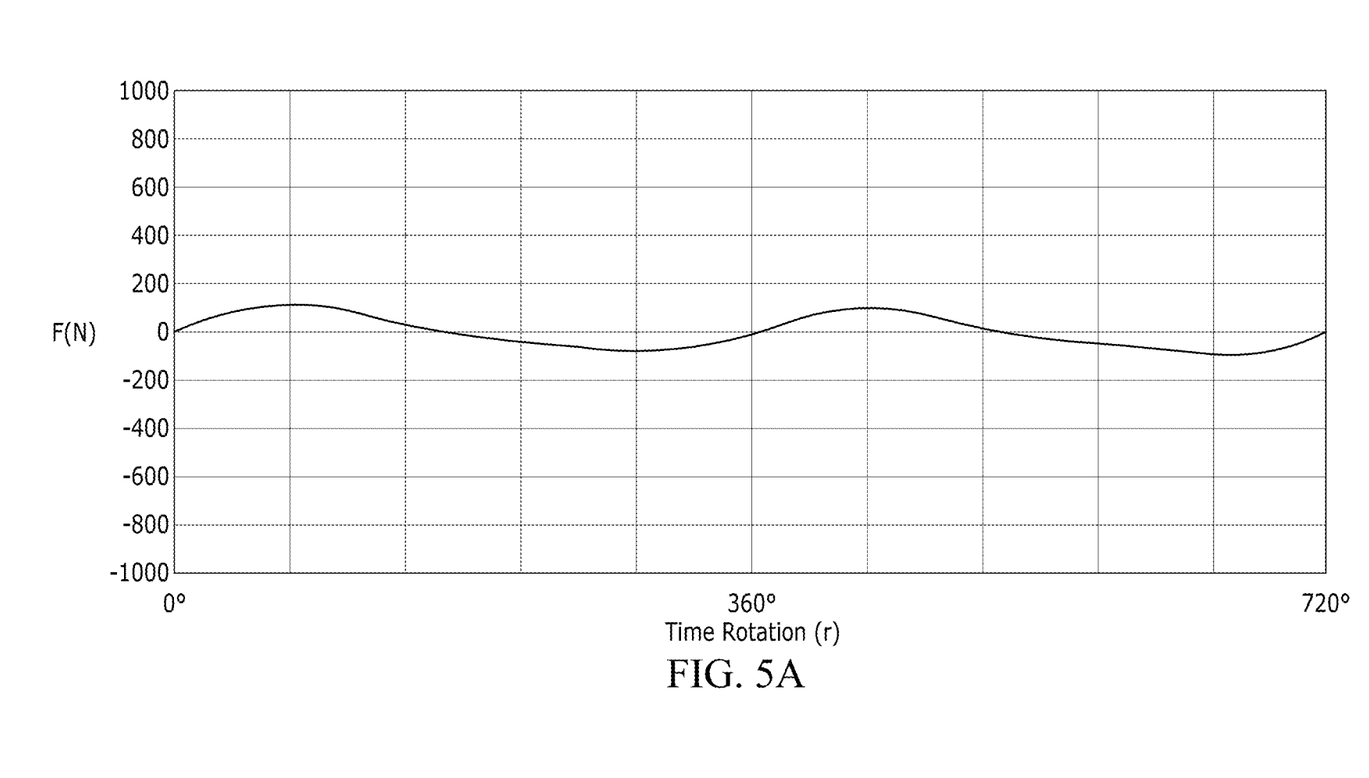
FIG. 5A is a graph illustrating clamping force over time.

As shown in FIG. 5A, the brake controller 130 tracks the braking/clamping force F on the rotor 38. This can either be calculated based on the signals received from the motor 120 indicative of the current draw. Alternatively or additionally, the load sensor 152 can directly supply the clamping force F to the brake controller 130. In either case, the brake controller 130 is capable processing the clamping force F over rotation (r) of the tire signal (or data) as a harmonic response function representing the interaction between the piston 80 and the rotor 38 during braking events. In other words, the interaction, or signal, between the piston 80 and the rotor 38 may be processed by a brake controller 130 to indicate a harmonic pattern as a function of the vehicle 20 speed, clamping force F, and dimensions of the rotor 38 during a brake event.

At the start of rotation at r=0°, the rotor 38 is rotating at some speed just prior to a brake event. A single rotation of the rotor 38 is between 0 and 360° and, thus, a single cycle will occur faster or slower in time depending on the rotor 38 speed at r=0°. Although not shown for the full duration of a braking cycle, the clamping force F will have an amplitude that may or may not decrease over time as the rotor 38 is eventually slowed to a stop, depending on the condition of the rotor 38.

Figure 5B:
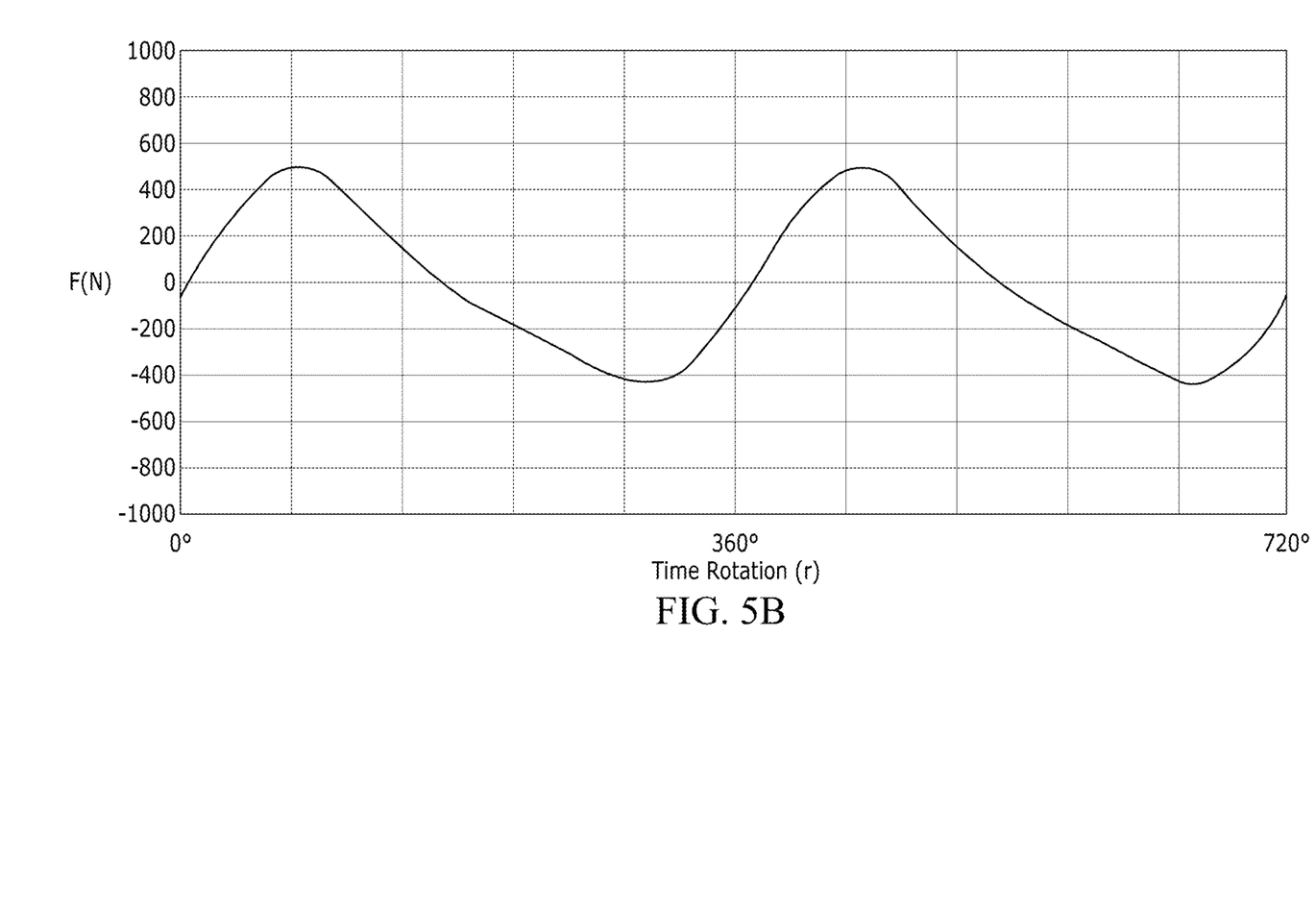
FIG. 5B is a graph illustrating a different clamping force over time.

Referring to FIGS. 5A and 5B, when the vehicle 20 brakes, the caliper assembly 60 is forced to follow the LRO in the rotor 38 as the rotor spins. Due to rotor 38 LRO, the clamping force F amplitude is affected by the rotor 38 rpm, the sliding force between the brake pads 37 and the caliper housing and the support, the mass of the caliper assembly 60 and the speed of the vehicle 20. The clamping force F amplitude variation about the commanded clamping force F is higher if the vehicle 20 speed is higher, as in FIG. 5B, or lower if the vehicle 20 speed is lower, as in FIG. 5A.

With this in mind, the plot indicated in FIG. 5A is indicative of a rotor 38 that is new or otherwise has a standard/normal LRO when the vehicle 20 speed is relatively high at the start of brake event. To this end, the deviation from the clamping force F applied would be minimal due to very small piston 80 travel coupled with small rotor 38 oscillation. In this example, the plot has a relatively lower amplitude, e.g., as shown about 100 N, that is less than a normal threshold amount. This plot would be substantially the same when decelerating from any speed, with any variation occurring only in the degree of lateral (inboard-outboard direction) vibration present/experienced by the operator.

That said, in this scenario the brake controller 130 assumes the rotor 38 is normal. More specifically, the relatively lower force amplitude is interpreted as the actual LRO of the rotor 38 being at or below the expected LRO for that particular rotor 38. In this scenario, the brake controller 130 does not generate an alert 56.

In another example shown at FIG. 5B, the clamping force F harmonic amplitude variation is above the normal threshold amount if the vehicle 20 speed is comparable to the case described above. This can be caused by several different situations and, thus, the speed of the vehicle 20 also needs to be considered. When the force amplitude of the plot only remains above the normal threshold while the vehicle 20 is traveling above a predetermined speed, the increased amplitude is likely caused by LRO only. Consequently, the brake controller 130 can use an alert 56 to notify the driver via the display 57 to check the rotor(s) 38 in situations in which the plot of FIG. 5B (or those similar thereto) is present.

If, however, the amplitude of the plot in FIG. 5B remains above the normal threshold amount regardless of the speed of the vehicle 20, the increased force amplitude is likely caused by DTV or issues with the caliper assembly 60 sliding mechanism. For instance, the sliding pins (not shown) on the caliper assembly 60 may be rusted and/or stuck and thereby prevent the caliper assembly from properly following the LRO/warp in the rotor 38. In response, the brake controller 130 can use an alert 56 to notify the driver via the display 57 to check the rotor(s) 38 and/or caliper assembl(ies) 60 where the plot of FIG. 5B (or those similar thereto) is present.

Once the clamping force F harmonic is acquired, the brake controller 130 can also analyze the signals defining the harmonic pattern using digital signal processing algorithms to further understand the condition of the rotor 38. Signal processing can be performed within the microprocessor of the brake controller 130 and/or within a dedicated digital signal processor (DSP) chip coupled thereto. In one example, the brake controller 130 can determine harmonic responses in the first and second orders to identify deviations in the received signals from what is expected and correlate those deviations with potential issue(s) with the rotor 38 and/or caliper assembly 60.

Figure 6:
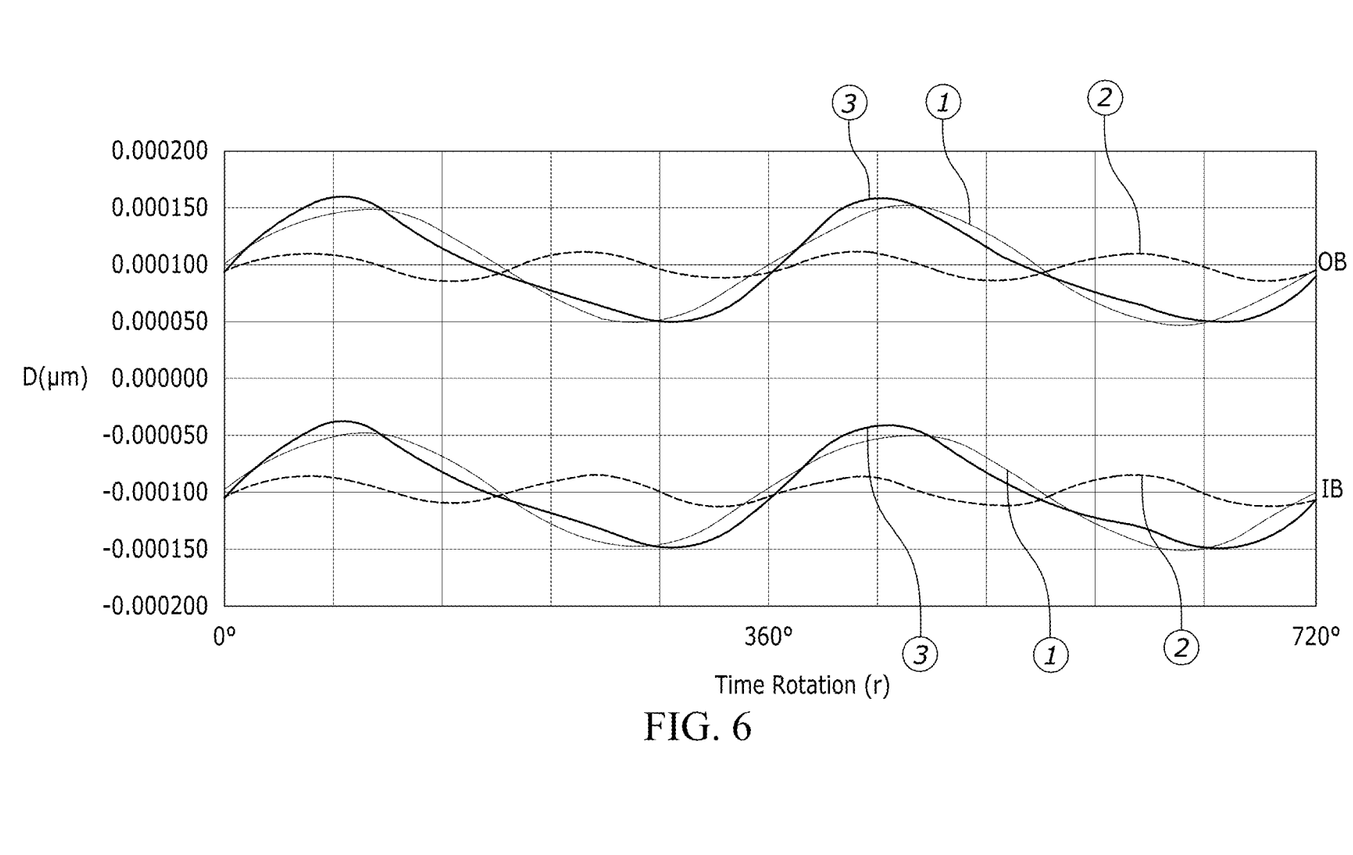
FIG. 6 are graphs illustrating deflections of disks of the rotor.

To this end, FIG. 6 illustrates various harmonic responses derived from the aforementioned harmonic plot. In this example, the x-axis remains tire rotation r and the y-axis represents the deviation D of the rotor 38 outer diameter from the mid plane 160. A single rotation of the rotor 38 still occurs between 0° and 360° r. The inboard plate 162 is indicated at IB. The outboard plate 164 is indicated at OB. The sinusoids indicated at ① are the first order harmonic responses, which have a single cycle over one full rotation of the tire. The first order harmonic responses are indicative of the rotor 38 deviation from the plane 166 or the LRO. The sinusoids indicated at ② are the second order harmonic responses associated with DTV or rotor warp, for example. The overall, sinusoid responses indicated at ③ are the sums of all the sinusoids for the respective plates 162, 164.

The second (and any third +) order harmonic responses can occur for several reasons. When the rotor 38 is new, the manner in which the wheel nuts (not shown) are tightened, e.g., too tight, too loose, unevenly, can generate higher order harmonic responses. When the rotor 38 is used, the higher order harmonic responses can arise from uneven rotor wear during normal use and/or warping due to cyclic or thermal gradients generated during braking. It will also be appreciated that combinations of any of these conditions can cause second or higher order harmonic responses.

Figure 7A:
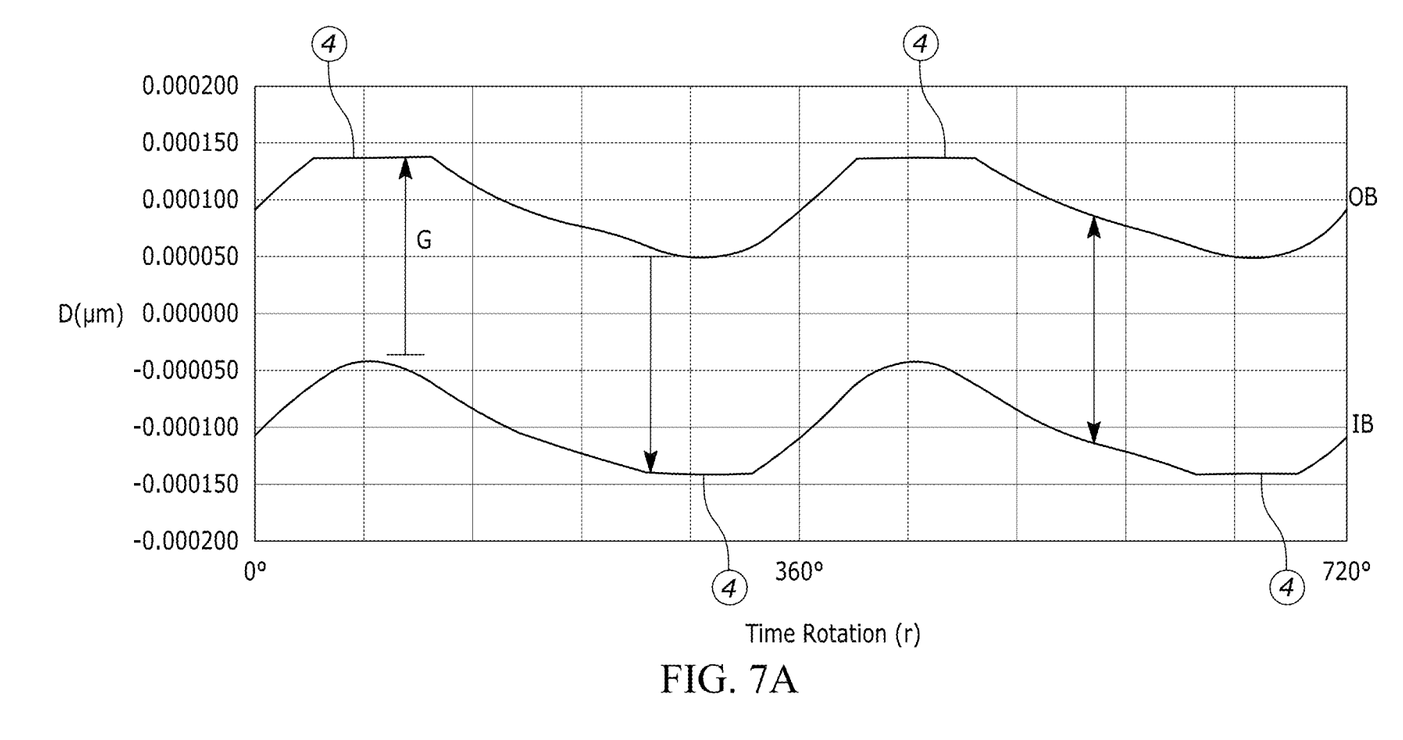
FIG. 7A are graphs illustrating changes in rotor disk thickness.
Figure 7B:
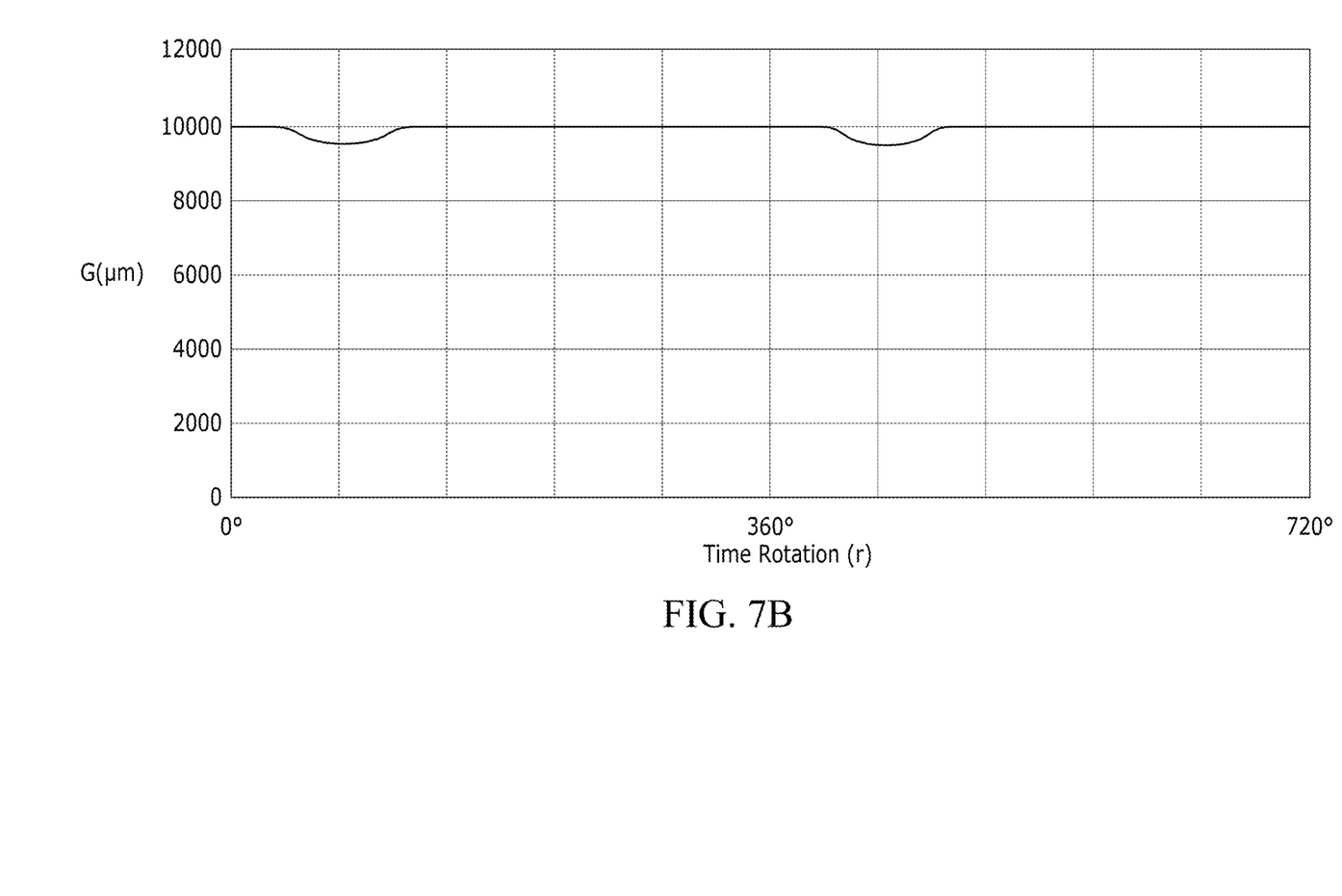
FIG. 7B is a graph illustrating differential rotor disk thickness based on FIG. 7A.

In another example shown in FIGS. 7A-7B, the harmonic responses for the respective IB and OB plates 162, 164 are shown and are indicative of DTV. The gap or spacing between the plates 162, 164 is illustrated by G. It is clear that the value of G changes over time, which is plotted specifically in FIG. 7B. More specifically, the distance between the surfaces 170, 172 varies between different angular positions of the rotor 38. Consequently, the rotor 38 has a DTV.

Figure 8A:
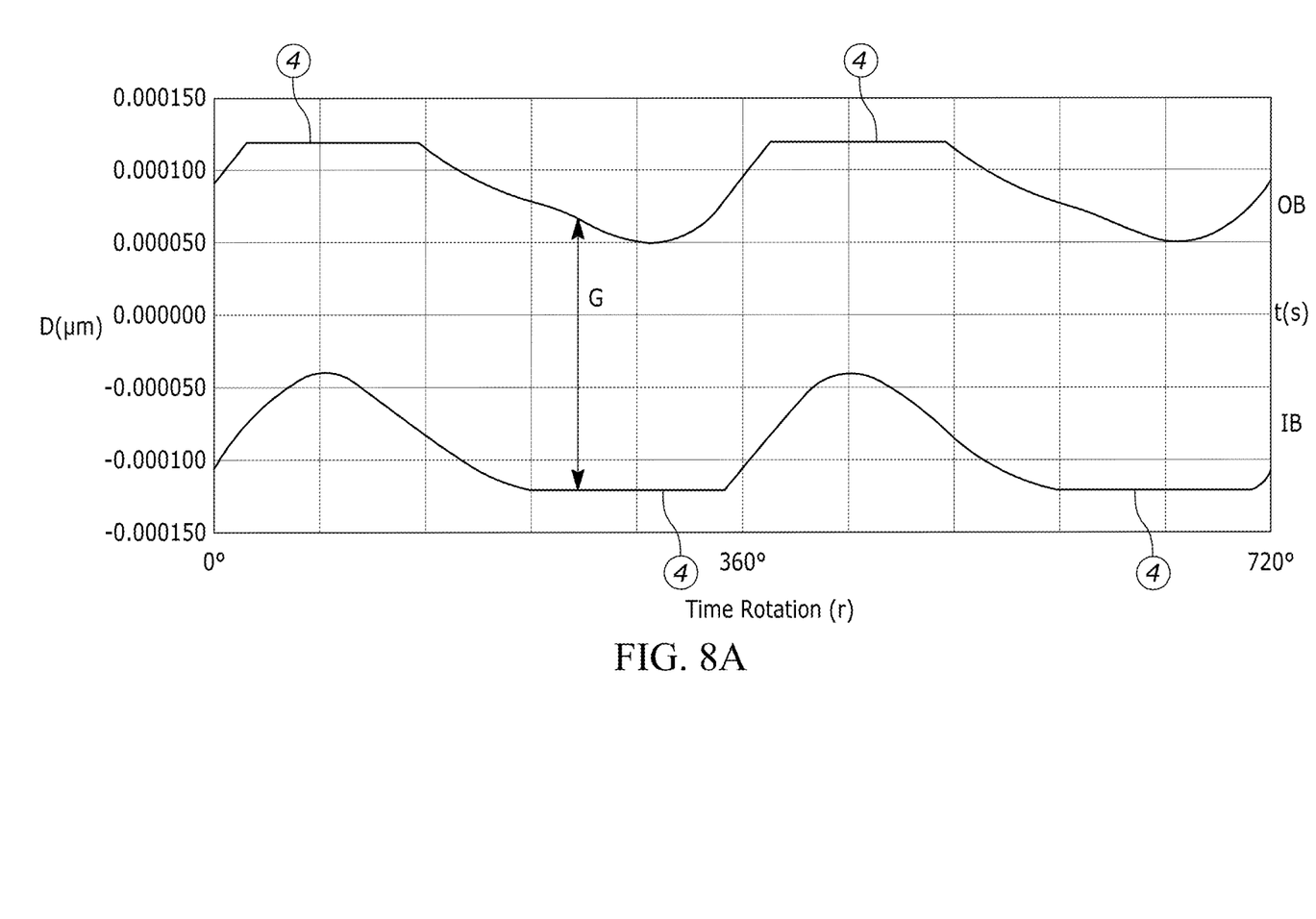
FIG. 8A are graphs illustrating different changes in rotor disk thickness.
Figure 8B:
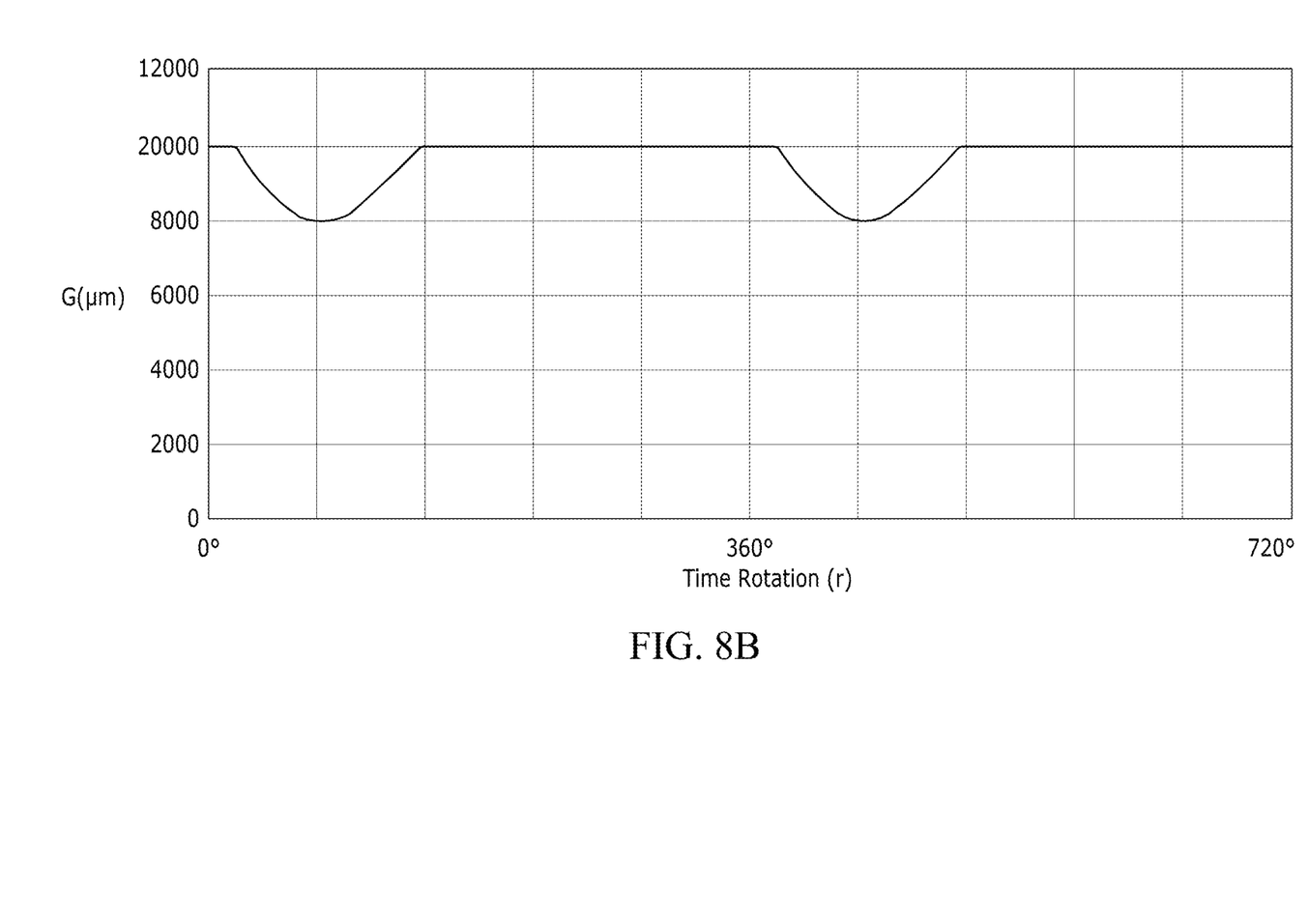
FIG. 8B is a graph illustrating differential rotor disk thickness based on FIG. 8A.

This can occur during off-braking driving on highways. In particular, highway driving can cause one or both brake pads 37 to lightly touch the rotor 38 at maximum LRO positions along the respective plates 162, 164. This slowly wears the peaks down (indicated at ④), which during braking generates a clamping force variation due to thinner regions of the rotor 38. In other words, the variation in the thickness (FIG. 7B) between surfaces 170, 172 produces variations in the clamping force F during brake events. If the DTV continues to increase the force variation likewise increases (see FIGS. 8A-8B).

Applying algorithms, such as a Fast Fourier transform (FFT) to any of the aforementioned plots would likely indicate first order harmonic responses (correlated to vehicle speed) as well as second or higher order vibrations (due to DTV or uneven rotor wear). In each case, the DTV is sufficient to cause the pads 37 to unevenly apply clamping force F to the rotor 38. In other words, the pads 37 are applied to a rotor 38 that is at least to some extent wedge-shaped. If the DTV exceeds a predetermined threshold on the order of about 9 μm, the unevenness may be sufficient to cause the vehicle 20 to vibrate (also known as Brake Torque Variation) during brake events.

It will be appreciated that the brake controller 130 can also monitor the clamping force F during non-braking events. A clamping force F present on a rotor 38 during non-braking events could be indicative of, for example, insufficient retraction of the piston 80 associated with that rotor. That said, the brake controller 130, in response to determining that a clamping force F is present outside a braking operation, can operate the motor 120 to retract the piston 80 until no clamping force is present or detected, preferably with a dedicated load sensor.

It will also be appreciated that the brake controller 130 can compare the harmonic patterns between braking events. In particular, the brake controller 130 can compare the amplitude of these different plots. If there is a sudden change in the plots between one braking event and the next, the brake controller 130 can alert the driver to inspect the rotor 38/caliper assembly 60 associated with the deviating plots as this could be caused by hitting a pothole, a backing into an object, etc.

Figure 9:
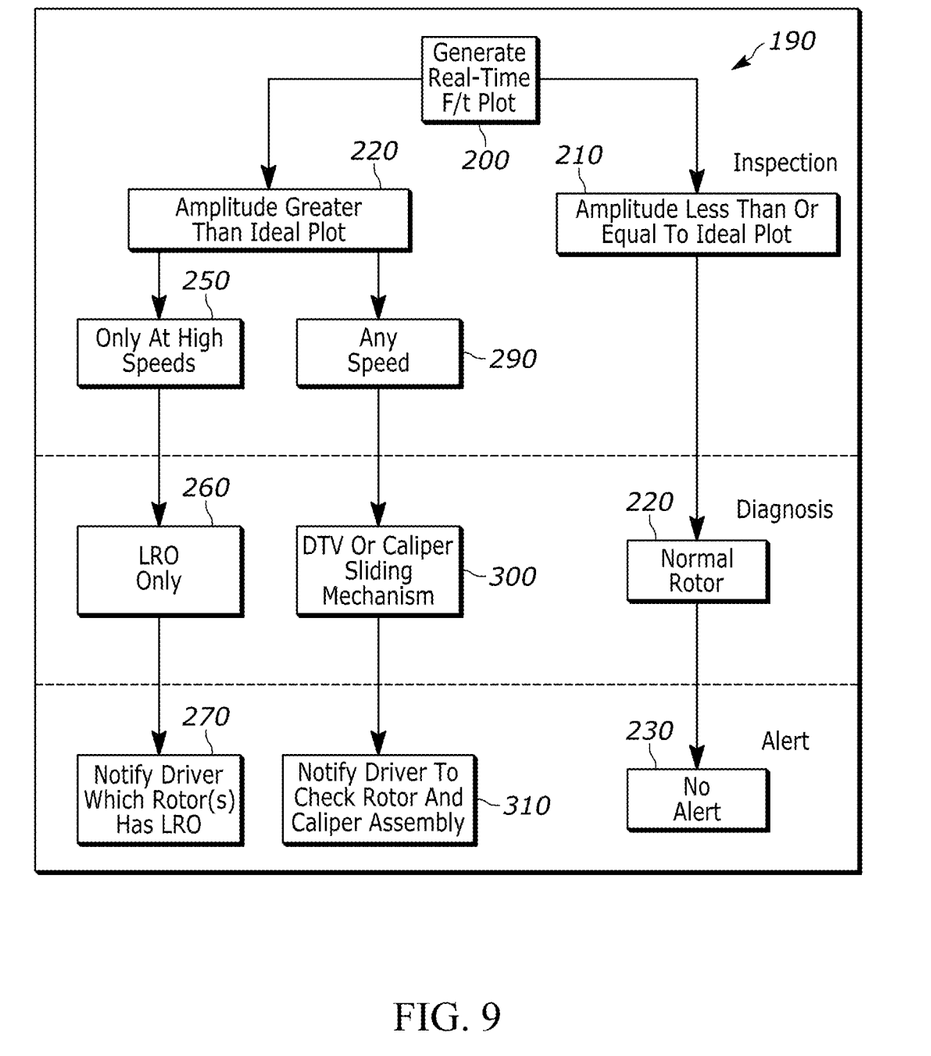
FIG. 9 is a flow chart illustrating a method of diagnosing a condition of the rotor.

FIG. 9 is a flow chart or method 190 illustrating the aforementioned process for analyzing the harmonic plot to determine a rotor condition. At step 200, the brake controller 130 generates a real-time, harmonic plot and compares the real-time plot to the ideal plot. When the amplitude of the real-time plot is equal to or less than the amplitude of the ideal plot (indicated at 210), the brake controller 130 determines the rotor 38 is normal at step 220. Consequently, no alert is provided to the operator, as indicated at 230.

On the other hand, at 220 the brake controller 130 determines that the real-time amplitude is greater than the ideal amplitude. If this is true only at relatively higher vehicle speeds (as indicated at 250), then the brake controller 130 determines at 260 that the rotor 38 is affected only by LRO. Consequently, the brake controller 130 notifies the operator at 270 which rotor(s) 38 are outside the normal LRO range.

If the brake controller 130 determines that the real-time amplitude is always greater than the ideal amplitude regardless of the vehicle speed (as indicated at 290), then the brake controller 130 determines at 300 that the rotor 38 is affected either by DTV or the caliper sliding mechanism. Consequently, the brake controller 130 notifies the operator at 310 to check both the affected rotor 38 and caliper assembly 60.

It will be appreciated that the system can also include a digital signal processor (DSP) (not shown) that can either be part of the controller 130 or connected thereto. In any case, the DSP can be used to receive signals from the sensor 152 and/or the MPS 150 and relay the signals to the controller 130. With this in mind, it will be appreciated that either the controller 130 and the DSP can evaluate the at least one harmonic response or the controller and DSP can separately or cooperatively evaluate the at least one harmonic response.

Regardless, it will also be appreciated that the results of the evaluation can be used to control the caliper assembly 60 in a manner that helps to mitigate the effects of undesirable rotor 36 conditions such as DTV, LRO, etc. In other words, the controller 130 (and/or DSR) can rely on the detected at least one harmonic to operate the caliper assembly 60 in a manner that counteracts or substantially counteracts the at least one detected harmonic to improve vehicle performance.

The present invention is advantageous in that it relies on harmonic responses indicative of the interaction between the piston and the rotor in each caliper assembly in order to monitor the condition of each rotor and, when needed, notify the vehicle operator that an issue exists. By detecting a braking or clamping force versus tire rotation harmonic response, the system of the present invention can analyze this response and/or generate additional harmonic responses in order to determine whether, for example, the rotor exhibits signs of LRO, DTV, and/or warping.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of monitoring a rotor of a motor vehicle having a caliper assembly driven by a motor for braking the vehicle, comprising:
   detecting at least one harmonic response during a braking operation indicative of the interaction between the caliper assembly driven by the motor and the rotor;
   evaluating the at least one harmonic response during the braking operation; and
   notifying an operator of the vehicle of a condition of the rotor based on the evaluation.

2. The method of claim 1, wherein at least one harmonic response is due to a clamping force variation relative to a target clamping force over time and the clamping force is calculated based on a measured current draw of the motor.

3. The method of claim 1, wherein at least one harmonic response is due to a measured clamping force variation relative to a target clamping force over time.

4. The method of claim 3, wherein the clamping force is directly measured by a force sensor provided on the caliper assembly.

5. The method of claim 3, wherein the clamping force is directly measured by a pressure sensor provided on the caliper assembly.

6. The method of claim 3, wherein the clamping force is directly measured by a torque sensor provided on the caliper assembly.

7. The method of claim 3, further comprising monitoring a speed of the vehicle and wherein the step of notifying the operator comprises notifying the operator that the rotor has a lateral runout (LRO) when the monitored clamping force has an amplitude variation greater than a predetermined value only while the monitored speed exceeds a threshold amount.

8. The method of claim 3, further comprising monitoring a speed of the vehicle and wherein the step of notifying the operator comprises notifying the operator that at least one of:

the rotor has a disk thickness variation (DTV); and the caliper assembly has a sliding mechanism issue are present when the monitored clamping force is greater than the predetermined value regardless of the monitored vehicle speed.

9. The method of claim 1, wherein the step of detecting at least one harmonic function comprises:

detecting a first order harmonic function of the rotor during the braking operation;

detecting a second order harmonic function of the rotor during the braking operation; and identifying a condition of the rotor based on the first and second order harmonic functions.

10. The method of claim 9, wherein the rotor condition is identified as LRO based on the overall harmonic response.

11. The method of claim 1, further comprising determining a thickness of the rotor based on the generated at least one harmonic function.

12. The method of claim 11, further comprising notifying an operator of the vehicle that the rotor condition is DTV when the monitored rotor thickness varies more than a threshold amount.

13. A system for monitoring a rotor of a motor vehicle having a caliper assembly driven by a motor for braking the vehicle, comprising:

at least one sensor connected to the caliper assembly for monitoring an interaction between the caliper assembly driven by the motor and the rotor during a braking operation; and a controller for receiving signals from the at least one sensor and detecting at least one harmonic response indicative of the interaction based on the signals, the controller being configured to notify an operator of the vehicle of a condition of the rotor in response to an evaluation of the at least one harmonic function.

14. The system of claim 13, wherein at least one harmonic function comprises clamping force over rotation of a tire.

15. The system of claim 14, further comprising a vehicle speed sensor for monitoring a speed of the vehicle and wherein the controller is configured to notify the operator that the rotor has LRO when the monitored clamping force is greater than a predetermined value only while the monitored speed exceeds a threshold amount.

16. The system of claim 14, further comprising a vehicle speed sensor for monitoring a speed of the vehicle and wherein the controller is configured to notify the operator that at least one of:

the rotor has a disk thickness variation (DTV); and the caliper assembly has a sliding mechanism issue are present when the monitored clamping force is greater than the predetermined value regardless of the monitored vehicle speed.

17. The system of claim 13, wherein the at least one sensor includes a sensor for measuring a current draw of the motor during the braking operation.

18. The system of claim 13, wherein the at least one sensor includes a sensor for directly measuring a clamping force on the rotor during the braking operation.

19. The system of claim 13, further comprising a digital signal processor that receives the signals from the at least one sensor and subsequently relays the signals to the controller.

* * * * *